(12) United States Patent
Zhang et al.

(10) Patent No.: US 10,527,446 B2
(45) Date of Patent: Jan. 7, 2020

(54) SYSTEM AND METHOD FOR DETERMINING LOCATION

(71) Applicant: BEIJING DIDI INFINITY TECHNOLOGY AND DEVELOPMENT CO., LTD., Beijing (CN)

(72) Inventors: Lingyu Zhang, Beijing (CN); Chong Shen, Beijing (CN); Zexiang Huang, Beijing (CN); Shengwei Li, Beijing (CN); Chao Guo, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/873,433

(22) Filed: Jan. 17, 2018

(65) Prior Publication Data

US 2018/0143034 A1    May 24, 2018

Related U.S. Application Data

(63) Continuation of application No. PCT/CN2016/112783, filed on Dec. 28, 2016.

(30) Foreign Application Priority Data

Mar. 16, 2016 (CN) .......................... 2016 1 0150555
Apr. 28, 2016 (CN) .......................... 2016 1 0283667
Sep. 7, 2016 (CN) .......................... 2016 1 0808446

(51) Int. Cl.
*G01C 21/36* (2006.01)
*H04W 4/02* (2018.01)
(Continued)

(52) U.S. Cl.
CPC ......... *G01C 21/3667* (2013.01); *G06F 16/29* (2019.01); *H04L 67/18* (2013.01);
(Continued)

(58) Field of Classification Search
CPC ........... G06F 17/30241; G06F 17/3087; G06F 17/30268; G06F 1/1626; H04W 4/02;
(Continued)

(56) References Cited

U.S. PATENT DOCUMENTS 8,484,188 B1   7/2013  Upstill et al.
8,589,069 B1  11/2013  Lehman
(Continued)

FOREIGN PATENT DOCUMENTS

CN    102185839 A    9/2011
CN    102984644 A    3/2013
(Continued)

OTHER PUBLICATIONS

International Search Report in PCT/CN2016/112783 dated Mar. 28, 2017, 5 pages.
(Continued)

*Primary Examiner* — George Eng
*Assistant Examiner* — Jing Gao
(74) *Attorney, Agent, or Firm* — Metis IP LLC

(57) ABSTRACT

The present disclosure relates to a method and system for determining a final location associated with a service requester. The method includes obtaining, by at least one computer server of an online transportation service platform, an initial location associated with a service requester; comparing, by the at least one computer server, the initial location with a plurality of candidate locations in a database to generate at least one match result; and determining, by the
(Continued)

at least one computer server, a final location based on the at least one match result, wherein the final location is associated with the initial location.

18 Claims, 11 Drawing Sheets

(51) Int. Cl.
*H04L 29/08* (2006.01)
*G06F 16/29* (2019.01)
*H04W 4/029* (2018.01)
*G01S 19/39* (2010.01)
*G06F 1/16* (2006.01)
*H04L 29/06* (2006.01)

(52) U.S. Cl.
CPC ............ *H04L 67/36* (2013.01); *H04W 4/029* (2018.02); *G01S 19/39* (2013.01); *G06F 1/1626* (2013.01); *H04L 29/06197* (2013.01)

(58) Field of Classification Search
CPC ..... H04W 64/00; H04W 4/021; H04W 4/025; H04W 4/043; H04W 4/023; H04W 4/026; H04W 4/04; H04W 4/14; H04W 4/21; H04W 84/12; G01C 21/32; G01C 21/165; G01C 21/343; G01C 21/3484; G01C 21/3605; G01C 21/3655; G01C 21/3667; G06Q 50/30; G06Q 10/02; G06Q 10/06315; G06Q 10/025; G06Q 30/0257; G06Q 30/0269; G06Q 50/01; G06Q 30/0261; H04B 17/27; H04L 29/06197; G01S 19/39

See application file for complete search history.

(56) References Cited

U.S. PATENT DOCUMENTS

| | | | |
|---|---|---|---|
| 9,125,022 B2 | 9/2015 | DiAcetis et al. | |
| 9,279,694 B1 | 3/2016 | Sheikh | |
| 2004/0236501 A1 | 11/2004 | Hirose et al. | |
| 2007/0069946 A1 | 3/2007 | Kaplan et al. | |
| 2009/0177385 A1* | 7/2009 | Matas | G01C 21/3614 701/533 |
| 2009/0271745 A1 | 10/2009 | Sakamoto et al. | |
| 2010/0287178 A1* | 11/2010 | Lambert | H04W 4/029 707/765 |
| 2012/0215806 A1 | 8/2012 | Pryakhin et al. | |
| 2015/0085781 A1* | 3/2015 | Itoh | H04W 8/26 370/329 |
| 2015/0281902 A1 | 10/2015 | Lehtiniemi et al. | |
| 2016/0183057 A1* | 6/2016 | Steiner | H04W 4/027 455/456.1 |
| 2016/0255470 A1* | 9/2016 | Lee | H04W 4/02 455/456.6 |

FOREIGN PATENT DOCUMENTS

| | | | | |
|---|---|---|---|---|
| CN | 103134506 A | | 6/2013 | |
| CN | 103197857 A | | 7/2013 | |
| CN | 103455558 A | | 12/2013 | |
| CN | 103456161 A | * | 12/2013 | |
| CN | 103593364 A | | 2/2014 | |
| CN | 103714311 A | | 4/2014 | |
| CN | 104580499 A | | 4/2015 | |
| CN | 104599161 A | | 5/2015 | |
| CN | 104794198 A | | 7/2015 | |
| CN | 104866795 A | | 8/2015 | |
| CN | 104899252 A | | 9/2015 | |
| CN | 105677793 A | | 6/2016 | |
| CN | 105978958 A | | 9/2016 | |
| WO | 2014074407 A1 | | 5/2014 | |
| WO | WO-2014183092 A1 | * | 11/2014 | G06Q 30/0251 |

OTHER PUBLICATIONS

Written Opinion of the International Searching Authority in PCT/CN2016/112783 dated Mar. 28, 2017, 5 pages.
Examination Report in European Application No. 16894237.3 dated Jun. 14, 2017, 8 pages.
Notice of Reasons for Rejection in Japanese Application No. 2018-502643 dated May 21, 2019, 5 pages.

* cited by examiner

SYSTEM AND METHOD FOR DETERMINING LOCATION

CROSS-REFERENCE TO RELATED APPLICATIONS

This application is a Continuation of International Application No. PCT/CN2016/112783, filed on Dec. 28, 2016, designating the United States of America, which claims priority of Chinese Application No. 201610150555.3 filed on Mar. 16, 2016, Chinese Application No. 201610283667.6 filed on Apr. 28, 2016, and Chinese Application No. 201610808446.6 filed on Sep. 7, 2016, the entire contents of each of which are hereby incorporated by reference.

TECHNICAL FIELD

This application relates generally to a system and method for determining a location, and in particular, a system and method for determining a final location associated with a user.

BACKGROUND

Online on-demand transportation services, such as online taxi hailing, becomes more and more popular. To send a taxi service request, a user may first install an application, such as DiDi Taxi, in his/her terminal device, such as a smart phone. Through the application, the user may be able to communicate with an online taxi hailing service platform, such as DiDi Chuxing, and send a taxi service request to the platform through the application. To do so, the user may input a location (e.g., a starting location, a destination location) through the terminal. Sometimes, however, the location input by the user may not describe a location accurately. Consequently, a taxi driver often finds it difficult to accurately pinpoint the user's location.

SUMMARY

In one aspect of the present disclosure, a system is provided. The system includes at least one processor and at least one computer-readable storage medium storing a first set of instructions for determining a final location associated with a service requester. When executing the first set of instructions, the at least one processor is detected to: obtain an initial location associated with a service requester; compare the initial location with a plurality of candidate locations in a database to generate at least one match result; and determine the final location based on the at least one match result, wherein the final location is associated with the initial location.

In another aspect of the present disclosure, a method is provide. The method is related to the method of determining a final location associated with a service requester. The method includes obtaining, by at least one computer server of an online transportation service platform, an initial location associated with a service requester; comparing, by the at least one computer server, the initial location with a plurality of candidate locations in a database to generate at least one match result; and determining, by the at least one computer server, a final location based on the at least one match result, wherein the final location is associated with the initial location.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
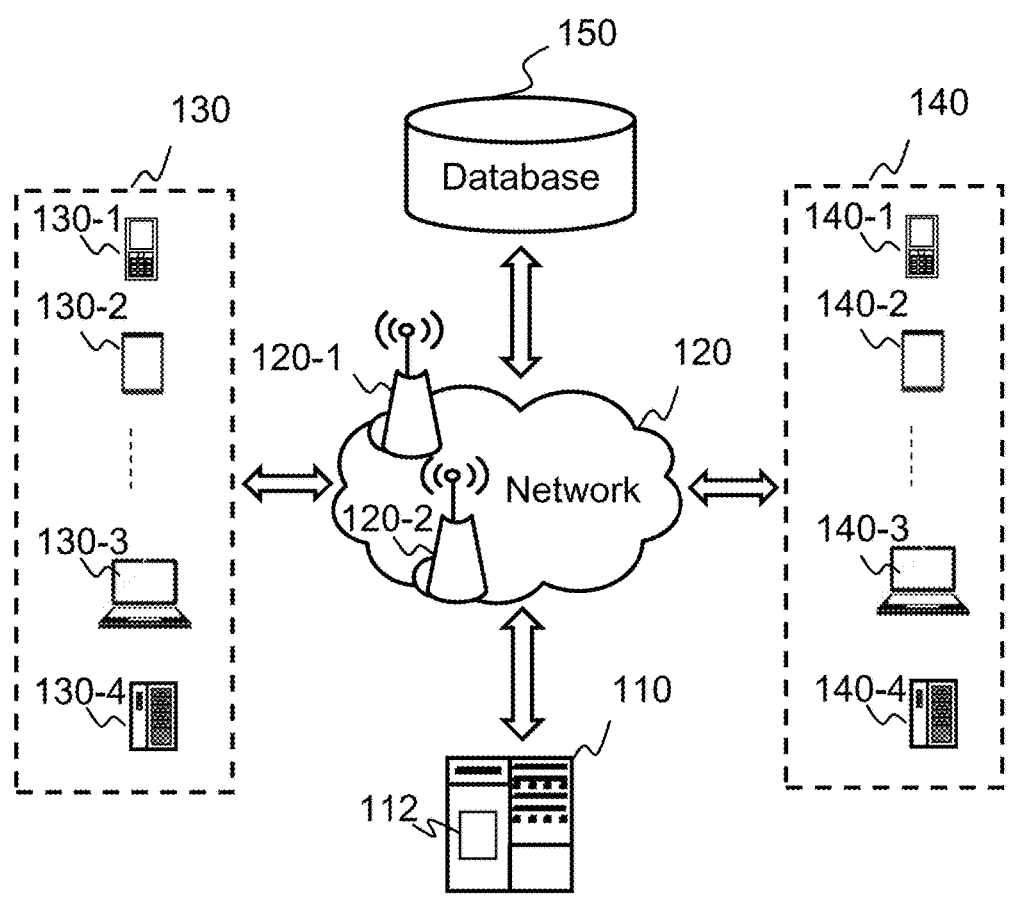
FIG. 1 is a block diagram of an exemplary system for on-demand service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to allocate a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger," "user equipment," "user terminal," and "passenger terminal" may be used interchangeably, and "driver" and "driver terminal" may be used interchangeably.

The term "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and method for determining a final location associated with a transportation service requester, such as a taxi service requester. To this end, the online on-demand transportation service platform may first obtain an initial location associated with a service requester; and then compare the initial location with a plurality of candidate locations stored in a database to generate at least one match result; and then select from the plurality of candidate locations one that best match the initial location as the final location. Since the plurality of candidate locations are pre-approved to be accurate, the final location may describe the location of the service requester more accurately than the initial location. Accordingly, the driver may find the service requester easily.

As described above, the technical problem and solution are rooted in online on-demand transportation service, which is a new form of service further rooted only in post-Internet era. It provides technical solutions to users (e.g., service requesters) and service providers (e.g., drivers) that could raise only in post-Internet era. In pre-Internet era, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service provides to respond to the service request simultaneously and in real-time. Therefore, through Internet, the online on-demand transportation systems may provide a much more efficient transaction platform for the users and the service providers that may never met in a traditional pre-Internet transportation service system. A service request from a user may include a location input by the user. Sometimes, the location input by the user may not describe a location accurately, the online on-demand transportation systems may determine a final location through comparing the location input by the user with a plurality of candidate locations in a database. Based on the final location, a driver may find the user easily.

FIG. 1 is a block diagram of an exemplary on-demand service system 100 according to some embodiments. For example, the on-demand service system 100 may be an online transportation service platform for transportation services such as taxi hailing, chauffeur service, express car, carpool, bus service, driver hire and shuttle service. The on-demand service system 100 may be an online platform including a server 110, a network 120, a user equipment 130, a driver terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the user equipment 130, the driver terminal 140, and/or the database 150 via the network 120. As another example, the server 110 may be directly connected to the user equipment 130, the driver terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a target vehicle based on the service request obtained from the user equipment 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the user equipment 130, the driver terminal 140, and the database 150) may send information and/or data to other component(s) in the on-demand service system 100 via the network 120. For example, the server 110 may obtain/acquire service request from the user equipment 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a service requester may be a user of the user equipment 130. In some embodiments, the user of the user equipment 130 may be someone other than the service requester. For example, a user A of the user equipment 130 may use the user equipment 130 to send a service request for a user B, or receive service and/or information or instructions from the server 110. In some embodiments, a provider may be a user of the driver terminal 140. In some embodiments, the user of the driver terminal 140 may be someone other than the provider. For example, a user C of the driver terminal 140 may user the driver terminal 140 to receive a service request for a user D, and/or information or instructions from the server 110.

In some embodiments, the user equipment 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the user equipment 130 may be a device with positioning technology for locating the position of the service requester and/or the user equipment 130.

In some embodiments, the driver terminal 140 may be similar to, or the same device as the user equipment 130. In some embodiments, the driver terminal 140 may be a device with positioning technology for locating the position of the driver and/or the driver terminal 140. In some embodiments, the user equipment 130 and/or the driver terminal 140 may communicate with other positioning device to determine the position of the service requester, the user equipment 130, the driver, and/or the driver terminal 140. In some embodiments, the user equipment 130 and/or the driver terminal 140 may send positioning information to the server 110.

The database 150 may store data and/or instructions. In some embodiments, the database 150 may store data obtained from the user equipment 130 and/or the driver terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the user equipment 130, the driver terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the user equipment 130, the driver terminal 140, etc.). In some embodiments, the database 150 may be part of the server 110.

In some embodiments, one or more components in the on-demand service system 100 (e.g., the server 110, the user equipment 130, the driver terminal 140, etc.) may have a permission to access the database 150. In some embodiments, one or more components in the on-demand service system 100 may read and/or modify information relating to the service requester, driver, and/or the public when one or more conditions are met. For example, the server 110 may read and/or modify one or more users' information after a service. As another example, the driver terminal 140 may access information relating to the service requester when receiving a service request from the user equipment 130, but the driver terminal 140 may not modify the relevant information of the service requester.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
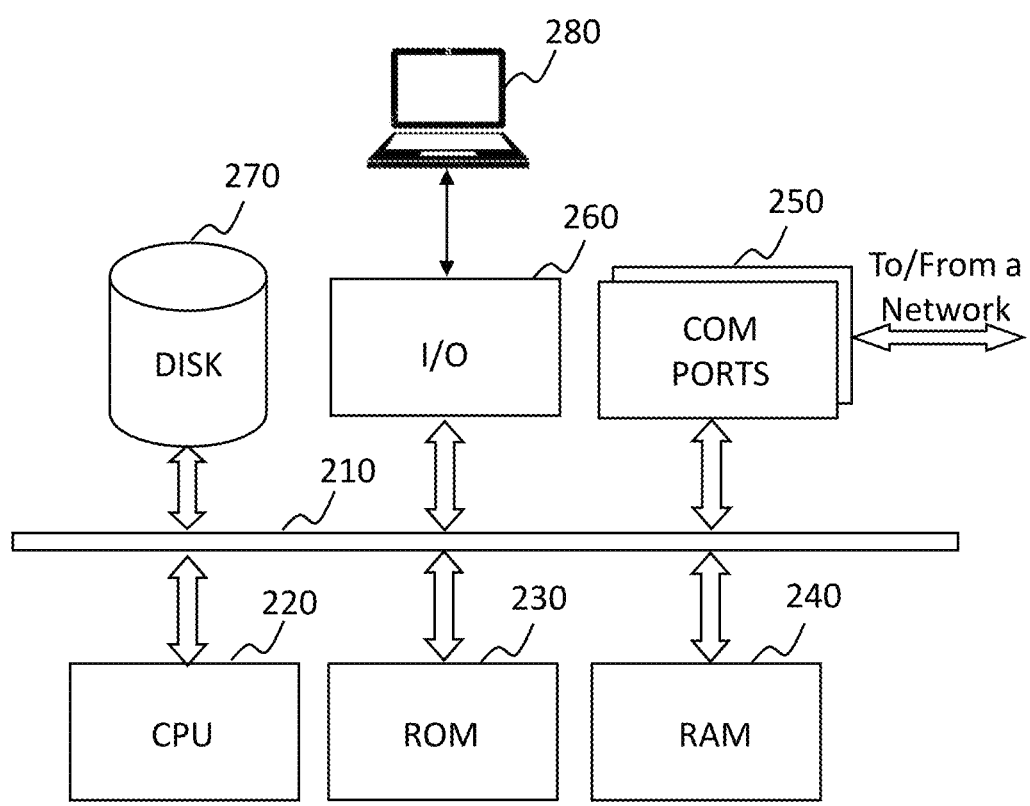
FIG. 2 is a block diagram of an exemplary computing device in the system illustrated in FIG. 1 according to some embodiments of the present disclosure.

FIG. 2 is a schematic diagram illustrating exemplary hardware and software components of a computing device 200 on which the server 110, the user equipment 130, and/or the driver terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

The computing device 200 may also include a hard disk controller communicated with a hard disk, a keypad/keyboard controller communicated with a keypad/keyboard, a serial interface controller communicated with a serial peripheral equipment, a parallel interface controller communicated with a parallel peripheral equipment, a display controller communicated with a display, or the like, or any combination thereof.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
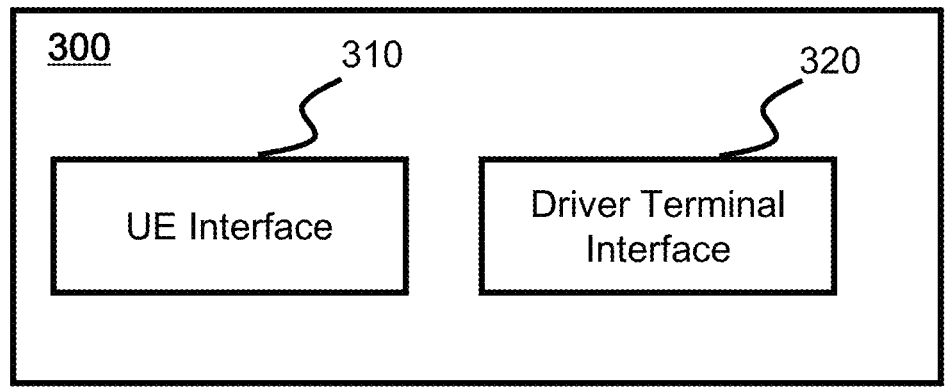
FIG. 3 is a block diagram of an exemplary network interface according to some embodiments of the present disclosure.

FIG. 3 is a block diagram of an exemplary network interface 300 in the server 110 according to some embodiments of the present disclosure. The network interface 300 may include a user equipment interface 310 (also referred to herein as "UE interface") and a driver terminal interface 320.

User equipment interface 310 may transmit information between server 110 and user equipment 130. As one example, a service request from a user equipment 150 may be transmitted through user equipment interface 310 to server 110. As another example, the user equipment 130 may transmit the initial location to server 110 through the user equipment interface 310. The server 110 may deliver the at least one match result (e.g., one or more matched locations) to user equipment 130 through the user equipment 310. When the point-selection icon is triggered (e.g., clicking or pressing the point-selection icon) by the service requester, the use equipment may send a corresponding signal to server 110 through the user equipment interface 310. Accordingly, server 110 (e.g., point selection module 450) may receive the signal and respond to call a map and instruct the user equipment to display the point-selection icon on the user interface through the user equipment interface 310.

Driver terminal interface 320 may transmit information between server 110 and driver terminal 140. As one example, server 110 may transmit an order to driver terminal 140 through terminal interface 320. As another example, server 110 may transmit the at least one match result to driver terminal 140 through terminal interface 320. In some embodiments, terminal interface 320 may transmit a response from driver terminal 140 to an order (e.g., accepting the order or rejecting the order) through driver terminal interface 320 to server 110.

In some embodiments, network interface 300 (e.g., UE interface 310, terminal interface 320) may be any type of wired network interface or wireless network interface. Merely by way of example, network interface 300 (e.g., UE interface 310, driver terminal interface 320) may include a cable network interface, a wireline network interface, an optical fiber network interface, a telecommunications network interface, an intranet interface, an Internet interface, a local area network (LAN) interface, a wide area network (WAN) interface, a wireless local area network (WLAN) interface, a metropolitan area network (MAN) interface, a wide area network (WAN) interface, a Public Telephone Switched Network (PSTN) interface, a Bluetooth network interface, a ZigBee network interface, a near field communication (NFC) network interface, or the like, or any combination thereof.

In some embodiments, network interface 300 (e.g., UE interface 310, terminal interface 320) may be implemented according to programming and/or computer language(s). Network interface 300 (e.g., UE interface 310, terminal interface 320) may include circuitry for coupling server 200 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMAX), session initiated protocol/real-time transport protocol (SIP/RTP), or any of a variety of other wireless communication protocols.

Figure 4:
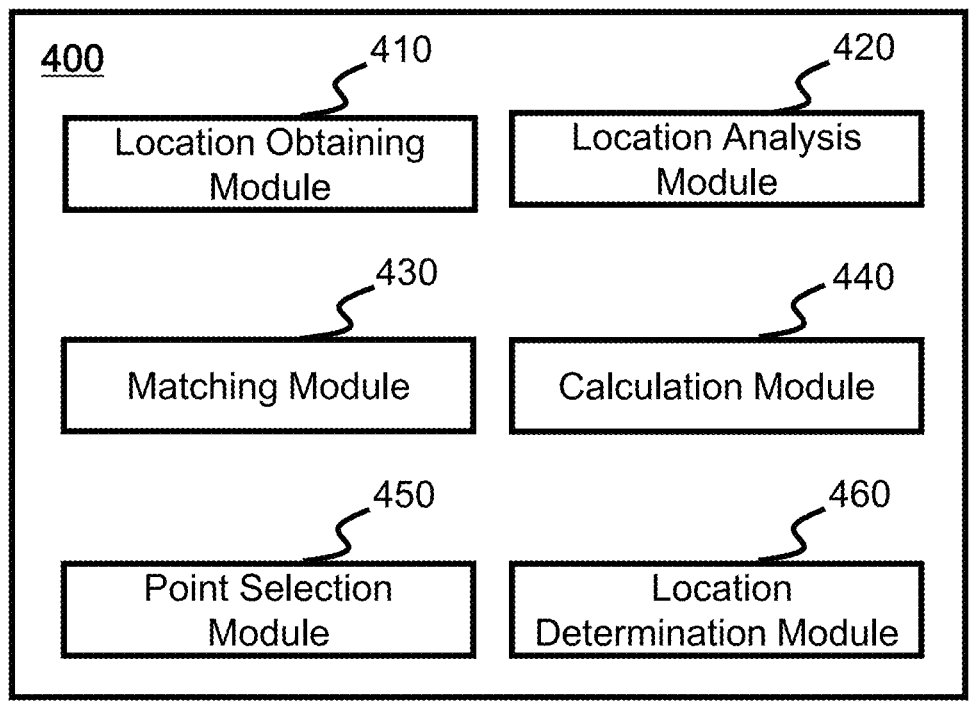
FIG. 4 is a block diagram of an exemplary processor according to some embodiments of the present disclosure.

FIG. 4 is a block diagram of an exemplary processing engine 400 (briefly referred to herein as processor 400) according to some embodiments of the present disclosure. Processor 400 may include a location obtaining module 410, a location analysis module 420, a matching module 430, a calculation module 440, a point selection module 450, and a location determination module 460.

The location obtaining module 410 may obtain a location (an initial location) associated with a service requester. The location associated with the service requester may include a current location of the service requester, a starting location of an order, a destination location of an order, or a pickup location of the service requester. Through a user equipment or a fix terminal in a fix location, the service requester may input the initial location associated with him/her, then the location obtaining module 410 may obtain the initial location through the user equipment interface 310. The location obtaining module may also obtain a plurality of candidate locations from database 150. The initial location and/or the plurality of candidate locations may be in the form of text, image, audio, video, or the like, or a combination thereof.

The location analysis module 420 may receive the initial location from the location obtaining module 410. If the initial location and/or the plurality of candidate locations are not textual, processor 400 (e.g., location analysis module 420) may convert to text first.

The matching module 430 may compare the initial location with the plurality of candidate locations. In some embodiments, the initial location and/or the plurality of candidate locations may include region information and address information. The region information may include a country, a province, a city, a district, or the like, or any combination thereof. The address information may include a street, a number, a name of a building, a room number, or the like, or any combination thereof. The matching module 430 may compare the address information of the initial location with the address information of the plurality of candidate locations. The matching module 430 may also compare the region information of the initial location with maps in database 150. The matching module 430 may generate a match result. In some embodiments, the match result may include one or more candidate locations (also referred to herein as matched locations). In some embodiments, the match result may include no candidate location. The user equipment 130 may display the match result on a user interface of the user equipment 130. In some embodiments, the user equipment may also display a point-selection icon with the match result on the user interface.

The calculation module 440 may calculate a distance between the initial location and each of the plurality of candidate locations. The distance may include an edit distance or a geographical distance. The edit distance may refer to a text similarity between the initial location and each of the plurality of candidate locations. The edit distance may be a number of different corresponding words or corresponding letters between the initial location and one candidate location. The geographical distance may include an Euclidean distance, a travel distance, a topological distance, a partition topological distance, a pathway topological distance, or the like, or a combination thereof. For example, the geographical distance may be a driving distance (the travel distance) between one of the candidate locations and the initial location.

The point selection module 450 may control a point-selection icon to display on the user interface. When the point-selection icon is triggered (e.g., clicking or pressing the point-selection icon), the use equipment may send a corresponding signal to the system 100. Accordingly, processor 400 (e.g., point selection module 450) may receive the signal and respond to call a map and instruct the user equipment to display the point-selection icon on the user interface, wherein the map may encompass the region information of the initial location. The point selection module 450 may also control a location of the point-selection icon when the point-selection icon shown on a map at the first time based on a first point-selection criteria.

The location determination module 460 may determine the final location of the initial location associated with the service requester. The location determination module 460 may determine the initial location received from the user equipment 130 as the final location directly if the initial location can describe a location accurately. The location determination module 460 may also select one location from the match result as the final location. The location determination module 460 may also determine the final location by using a map encompassing the initial location.

Figure 5:
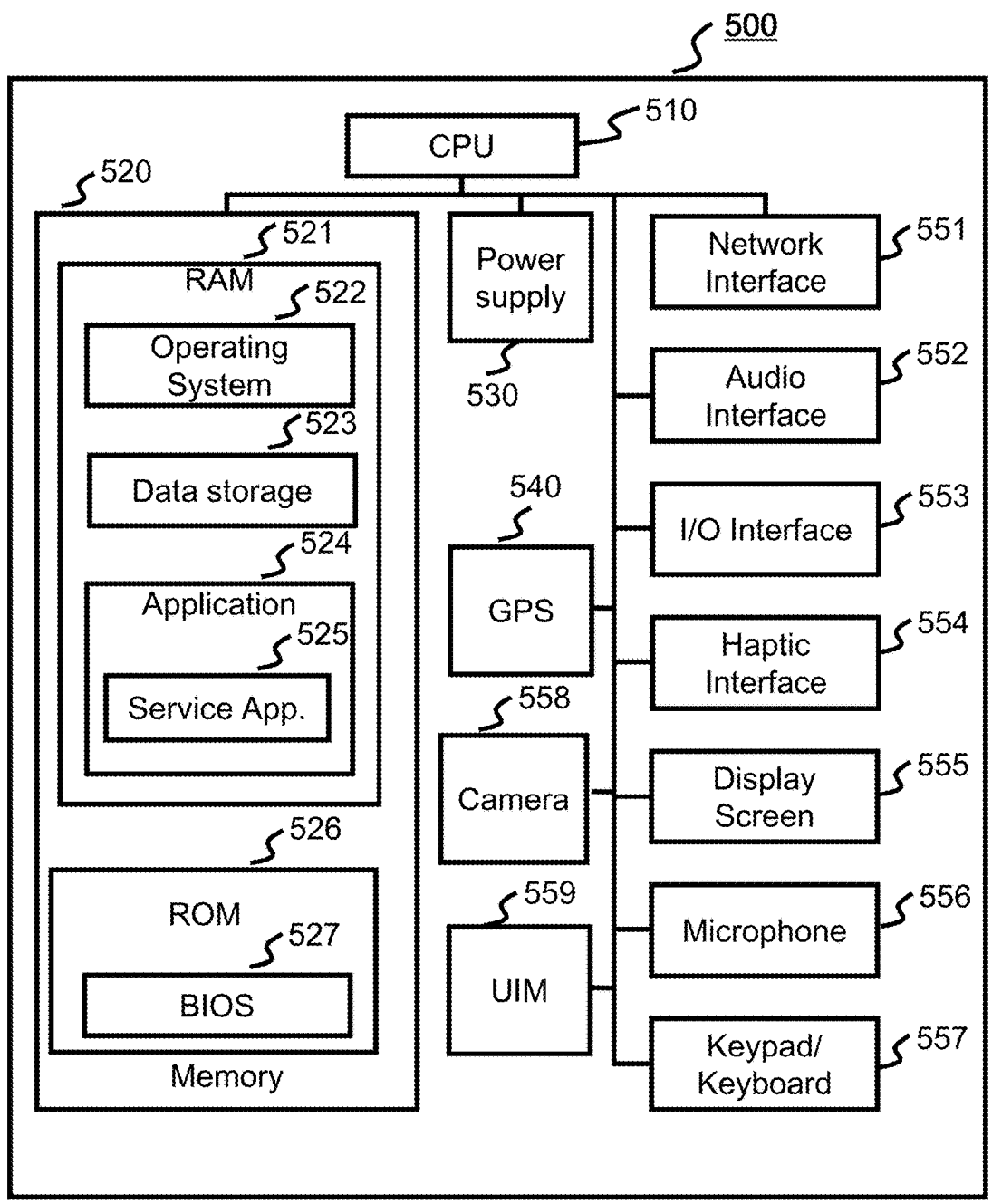
FIG. 5 is a block diagram of an exemplary terminal according to some embodiments of the present disclosure.

FIG. 5 shows an example of a schematic diagram illustrating a terminal 500 (e.g., user equipment 130 or driver terminal 140). Terminal 500 may include a processing unit (also referred to herein as CPU) 510, a memory 520, a power supply 530, a global positioning system (GPS) module 540. CPU 510 may process information from other units of terminal 500 or from other modules or units in system 100. Terminal 500 may include other processors. CPU 510 or other processor may include a digital signal processor, a microprocessor, an analog-digital converter, a digital-analog converter, an audio encoder, a modulator, a demodulator, or the like, or any combination thereof. CPU 510 or other processors may control memory 520 or data storage 523 to store information.

Memory 520 may include a volatile memory and a non-volatile memory. For example, memory 520 may include a random access memory (RAM) 521 and a read-only memory (ROM) 526. RAM 521 may store some information including an operating system (OS) 522, one or more application 524 or data that may be quickly reached and may be stored in data storage 523. Operating system may include iOS, Android, Windows Phone, or the like. For a transportation system, application 524 may include one or more service application 525, such as a transportation service application program. Application 524 may be implemented by CPU 510. ROM 526 may include a basic input/output system (BIOS) 527. Power supply 530 may supply electric energy to terminal 500. Global positioning system (GPS) module 540 may provide a location of terminal 500.

In some embodiments, terminal 500 may include one or more antennas communicated with a transmitter and a receiver (not shown in FIG. 5). In some embodiments, terminal 500 may include a network interface 551. Network interface 551 may exchange information between terminal 500 and network. For example, an order from a user equipment 130 may be transfer to server 110 through network interface 351 via network 120. As another example, driver terminal 140 may accept an order send from server 110 via network 120 through network interface 451. A location of user equipment 130 or driver terminal 140 may be transfer to server 110 through network interface 551. Network interface 551 may include circuitry for coupling terminal 500 to one or more networks, and may be constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMAX), session initiated protocol/real-time transport protocol (SIP/RTP), or any of a variety of other wireless communication protocols.

In some embodiments, terminal 500 may include an audio interface 552. Audio interface 552 may take various audio inputs and convert them into digital data. For example, terminal 500 may connect with a loudspeaker or a headphone through the audio interface 552. In some embodiments, computing device 500 may include an input/output interface (I/O interface) 553. I/O interface 553 may transfer information between internal storage of terminal 500, e.g., memory 520, and external I/O device, e.g., a mouse, a keyboard, a monitor, a printer, or the like. In some embodiments, terminal 500 may include a haptic interface 554. Haptic interface 554 may take inputs obtained through sensations or movements and convert them into digital data for processing by terminal 500.

In some embodiments, terminal 500 may include a display screen 555. The display screen may include a touch screen or other screens. In some embodiments, terminal 500 may include a microphone 556. In some embodiments, terminal 500 may include a keypad or keyboard 557. The keypad or keyboard 557 may include number keys(e.g., 0~9), special keys (e.g., star, octothorpe), or other keys used to operate the terminal 500.

In some embodiments, terminal 500 may include a camera 558. The camera 558 may capture static images or dynamic images.

Terminal 500 may also include a user identity module (UIM) 559. The UIM may include a storage capable of processing information. The UIM may include a subscriber identity module (SIM), a universal integrated circuit card (UICC), a universal subscriber identity module (USIM), a removable user identity module (R-UIM), or the like, or any combination thereof.

Figure 6:
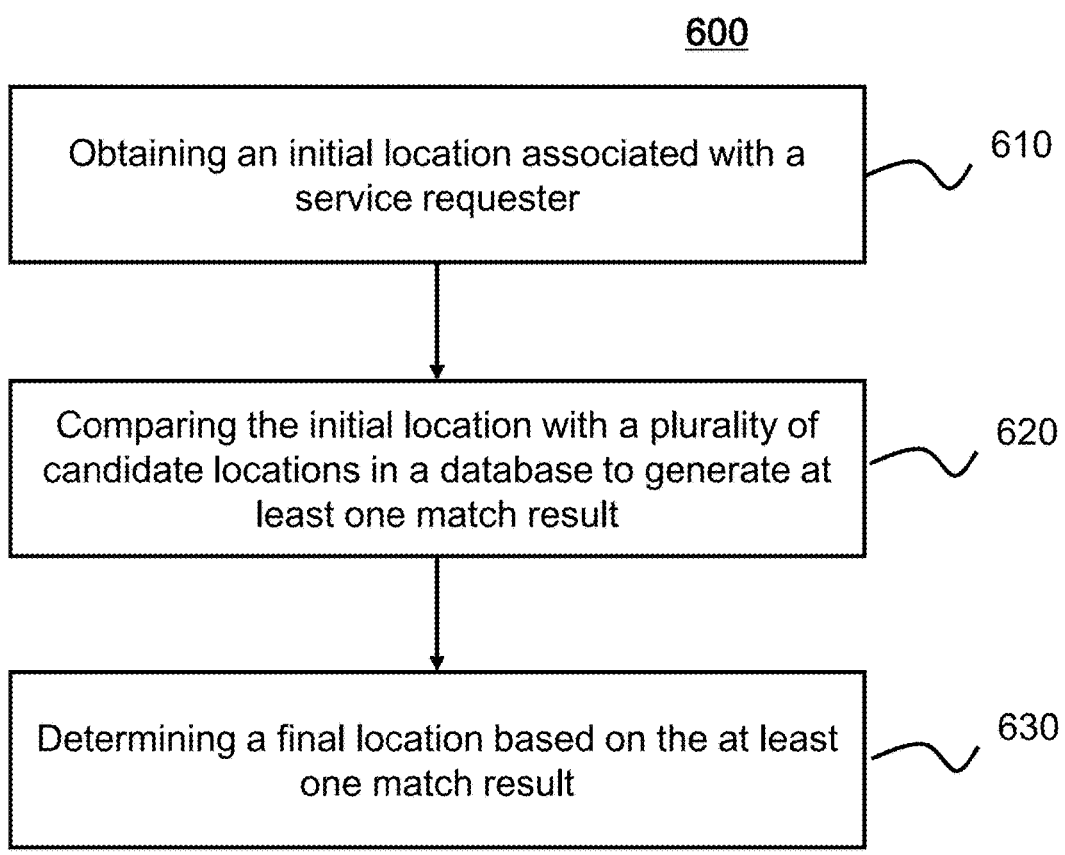
FIG. 6 is a flowchart of an exemplary process for determining a final location according to some embodiments of the present disclosure.

FIG. 6 is a flowchart of an exemplary process for determining a final location based on an initial location associated with a service requester according to some embodiments of the present disclosure. In some embodiments, the process and/or method 600 may be implemented in the system 100 as illustrated in FIG. 1. For example, the process and/or method 600 may be implemented as one or more sets of instructions and stored in database 150 and/or storage in processing engine 112, and called and/or executed by processor 400.

The initial location may include a current location of a service requester, a starting location, a destination location, or a pickup location designated by the service requester. In some embodiments, the initial location input by a service requester may describe a location clearly. Server 110 may send the initial location to a driver terminal directly and a driver associated with the driver terminal may find the location of the service requester easily.

In some embodiments, the initial location input by the service requester may be unclear, and server 110 may determine another location (also referred to herein as a final location) to replace the initial location. The final location may be similar to the initial location in text or close to the initial location in geography. Server 110 may send the final location to a driver terminal and a driver associated with the driver terminal may find the service requester easily based on the final location.

As illustrated in FIG. 6, in step 610, processor 400 (e.g., location obtaining module 410) may obtain an initial location (e.g., a starting location, a destination location) associated with a service requester. In some embodiments, the initial location may be input through a user equipment 130 by the service requester. For example, the service requester may enter an initial location (e.g., having a number, a street, a city, a country) associated with a starting location and/or a destination location through the user equipment 130. The user equipment 130 may include an intelligent equipment, for example, a smartphone, a personal digital assistance (PDA), a tablet personal computer, a laptop, or the like, or any combination thereof.

In some embodiments, the initial location input by a service requester may describe a location accurately. Server 110 may send the initial location to a driver terminal directly and a driver associated with the driver terminal may find the location of the service requester easily. In some embodiments, user equipment 130 may obtain data associated with the initial location. In some embodiments, the data associated with the initial location may be processed in a processor of user equipment 130 to generate the initial location. In some embodiments, the data associated with the initial location may be sent to processor 400 and then the processor 400 may determine the initial location based on the data associated with the initial location.

In some embodiments, the initial location may be obtained by scanning a bar code by user equipment 130 associated with the service requester. The bar code may contain an identification of location information. When requesting a transport service, the service requester may use the user equipment 130 to scan a bar code to determine the current location or the starting location. The bar code may include a one-dimensional bar code, a two-dimensional bar code, or a multi-dimensional bar code. The bar code may include a single color bar code, a bicolor bar code, a multicolor bar code. In some embodiments, the bar code may be a two-dimensional and multicolor bar code. In some embodiments, the bar code may be pasted in a predetermined location of a building, e.g., on one or more doors of the building, on the internal/external surface of the building, etc. The bar code may also contain an anchor. The anchor may refer to an identifier of the bar code. Based on the anchor, processor 400 may determine a location of the bar code associated with the anchor. Database 150 may store the relationship between anchors and locations. When the name of the building is changed, there is no need to change the bar code pasted on it, and system 100 (e.g., server 110) may just need to change the relationship between the anchor and the location.

In some embodiments, the initial location may be obtained by trigging a fix terminal in a fix location by the service requester. In a city, there may be placed a plurality of fix terminals in a plurality of fix locations. Each fix terminal may correspond to a location. A service requester may press a button/icon on the fix terminal to request a transport service. When the service requester trigs the fix terminal, system 100 (e.g., server 110) may obtain a location of the service requester (e.g., a current location or a starting location) and a driver may go to the location to pick up the service requester. In some embodiments, through the fix terminal, the service requester may also input a destination location. The fix terminal may also include a screen to display vehicles available to accept a passenger within a predetermined distance from the location of the fix terminal. The predetermined distance may include a predetermined value, including, e.g., from 0 to 1 kilometer, 1.1 kilometers to 2 kilometers, 2.1 kilometers to 3 kilometers, 3.1 kilometers to 4 kilometers, 4.1 kilometers to 5 kilometers, or larger than 5 kilometers.

In some embodiments, a service requester may choose one location from a location list as the initial location. The location list associated with the service requester may be predetermined in database 150. The location list may include a plurality of locations. The plurality of locations may be recently used or once used by the service requester. The plurality of locations may also include the locations of banks, stores, hospitals, restaurants, markets, or the like, or a combination thereof.

In some embodiments, when server 110 obtains the initial location associated with a service requester, server 110 may send the initial location to a driver terminal directly. In some embodiments, server 110 may compare the initial location with a plurality of candidate locations stored in database 150 to generate at least one match result in step 620. Server 110 may perform the comparison based on some factors, including, a text similarity between the initial location and each of the plurality of candidate locations, a geographical distance between the initial location and each of the plurality of candidate locations, or the like, or a combination thereof. The geographical distance may include an Euclidean distance, a travel distance, a topological distance, a partition topological distance, a pathway topological distance, or the like, or a combination thereof. For example, the geographical distance may be a driving distance (the travel distance) between one of the candidate locations and the initial location.

In some embodiments, there may be no candidate locations that have names similar to the initial location or are geographically close to the initial location, so the match result may include no location. In some embodiments, there may be one or more candidate locations that have names similar to the initial location or are geographically close to the initial location, so the match result may include the one or more candidate locations (also referred to herein as matched locations). Detailed description about the process and/or method of comparing the initial location with the plurality of candidate locations may be described in FIG. 7.

In step 630, processor 400 may determine a final location based on the at least one match result. In some embodiments, when one or more matched locations meet the service requester's requirement, the service requester may select one matched location as the final location. For example, the initial location input by the service requester is represented as "location A", the matched locations determined by server 110 include "location B", "location C" and "location D", and the service requester determines that the location B may be another way to represent the location A or that the location B is close to the location A, the service requester may select the location B as the final location.

In some embodiments, user equipment 130 may also display a point-selection icon on a user interface. When there is no location to be selected or the locations shown on the user interface locations may not meet the service requester's requirement, server 110 may determine the final location by using a map of a geographical area when detecting that the point-selection icon is triggered by the service requester. The map of the geographical area may encompass the initial location. Detailed description about the process and/or method of determining the final location by using a map may be described in FIG. 9.

Figure 7:
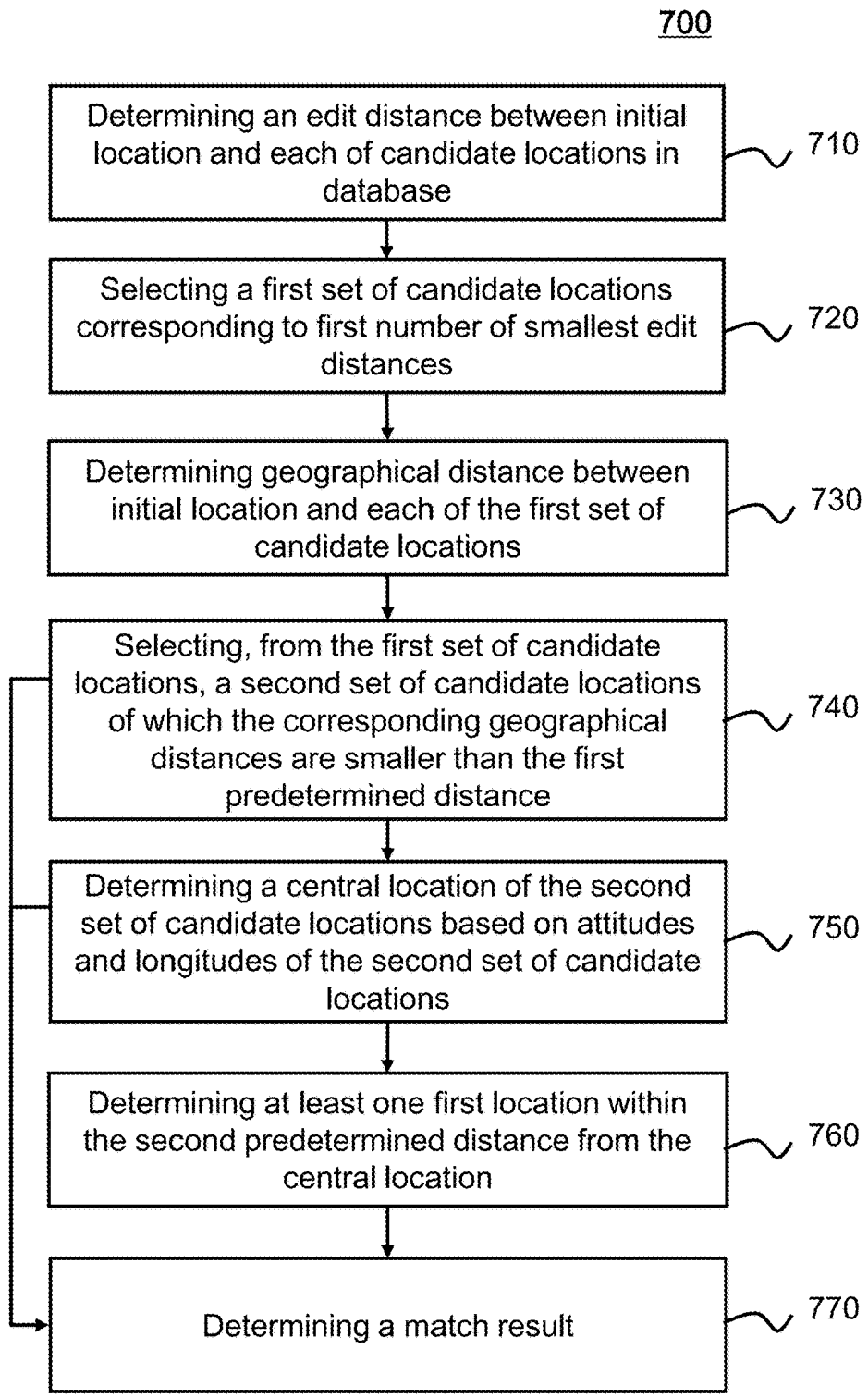
FIG. 7 is a flowchart of an exemplary process for determining a match result according to some embodiments of the present disclosure.

FIG. 7 is a flowchart of an exemplary process for determining a match result according to some embodiments of the present. In some embodiments, the process and/or method 700 may be implemented in the system 100 as illustrated in FIG. 1. For example, the process and/or method 700 may be implemented as one or more sets of instructions and stored in database 150 and/or storage in processing engine 112, and called and/or executed by processor 400.

When obtaining the initial location, processor 400 may obtain a plurality of candidate locations from database 150. The initial location and/or the plurality of candidate locations may be in the form of text, image, audio, video, or the like, or a combination thereof. If the initial location and/or the plurality of candidate locations are not textual, processor 400 (e.g., location analysis module 420) may convert to text first.

In step 710, processor 400 (e.g., calculation module 440) may determine an edit distance between the initial location and each of the plurality of candidate locations by using an algorithm. The algorithm may include a K Nearest Neighbors (KNN) algorithm, a K-means algorithm, or the like.

The edit distance may refer to a text similarity between the initial location and each of the plurality of candidate locations. The edit distance may be a number of different corresponding words or corresponding letters between the initial location and one candidate location. To describe conveniently, the initial location may be represented as "A", a candidate location may be represented as "B", the edit distance between the initial location and the candidate location may be represented as F(A, B). If the initial location and the candidate location are the same in text (i.e., A=B), the edit distance F(A, B) is zero. If the initial location includes no word or letter (i.e., A=0), the edit distance F(A, B) is the length of the candidate location, represented as len(B); and vice versa, if the candidate location includes no word or letter (i.e., B=0), the edit distance F(A, B) is the length of the initial location, represented as len(A). The length of a location may refer to the number of words or letters included in the location. Besides, F(A, B)=F(B, A). If the initial location and the candidate location are different, the edit distance between the initial location and the candidate location may be determined based on the Equation 1:

$$F(A, B) = \min\{F(A-1, B), F(A, B-1), F(A-1, B-1)\} \quad \text{(Equation 1)}$$

In step 720, processor 400 may select a first set of candidate locations corresponding to a first number of smallest edit distance. The first number may be 1, 2, 3, 4, 5, 6, 7, 8, 9, 10, or larger than 10. The first set of candidate locations may include N candidate locations.

In step 730, processor 400 may determine a geographical distance between the initial location and each of the first set of candidate locations based on longitudes and attitudes of the first set of candidate locations. The geographical distance may include a Euclidean distance, a travel distance, a topological distance, a partition topological distance, a pathway topological distance, or the like. In one embodiment, the longitude and attitude of the initial location is represented as (x1, y1), and the longitude and attitude of one of the first set of candidate locations is represented as (x2, y2), then the geographical distance L between the initial location and the candidate location may be represented as Equation 2:

$$L = \sqrt{(x1-x2)^2 + (y1-y2)^2} \quad \text{(Equation 2)}$$

In step 740, processor 400 may select a second set of candidate locations from the first set of candidate locations, wherein the second set of candidate locations may include M candidate locations, wherein M is not larger than N. The second set of candidate locations may be referred to herein as matched locations. The corresponding geographical distance between the initial location and each of the M candidate locations may be smaller than a first predetermined distance. The first predetermined distance may include a predetermined value, including, from 0 to 1 kilometers, 1.1 kilometers to 2 kilometers, or larger than 2 kilometers. In some embodiments, the first predetermined distance may include any suitable value, including, from 0 to 100 meters, 101 meters to 200 meters, 201 meters to 300 meters, 301 meters to 400 meters, 401 meters to 500 meters, 501 meters to 600 meters, 601 meters to 700 meters, 701 meters to 800 meters, 801 meters to 900 meters, 901 meters to 1000 meters.

In step 770, processor 400 may determine the second set of candidate locations as the match result. Processor 400 may send whole or part of the second set of candidate locations to a driver terminal 140, which may be helpful for a driver associated with the driver terminal 140 to find a passenger easily. In some embodiments, the match result may be send to user equipment 130. A service requester associated with the user equipment 130 may select one of the match result as a final location. The final location may then be sent to the driver terminal 140.

In some embodiments, processor 400 may further determine a central location of the second set of candidate locations based on the attitudes and longitudes of the second set of candidate locations in step 750. For example, processor 400 may determine the central location by using an algorithm, including, e.g., an arithmetic mean algorithm, a weighted arithmetic mean algorithm, etc. In some embodiments, the central location may be the same with one of the second set of candidate locations. In some embodiments, the central location may be different from each of the second set of candidate locations. Then, in step 770, processor 400 may determine the central location as the match result, and processor 400 may send the central location to a driver terminal 140, which may be helpful for a driver associated with the driver terminal 140 to find a passenger easily. In some embodiments, the match result may be send to user equipment 130. A service requester associated with the user equipment 130 may select the central location as a final location. The final location may then be sent to the driver terminal 140.

In some embodiments, the central location obtained in step 750 may be inside of a building, therefore, processor 400 may determine at least one first location within a second predetermined distance from the central location to make the first location be outside of the building in step 760. The second predetermined distance may include an arbitrary value, including, from 0 to 1 kilometers, 1.1 kilometers to 2 kilometers, or larger than 2 kilometers. In some embodiments, the second predetermined distance may include any suitable value, including, from 0 to 100 meters, 101 meters to 200 meters, 201 meters to 300 meters, 301 meters to 400 meters, 401 meters to 500 meters, 501 meters to 600 meters, 601 meters to 700 meters, 701 meters to 800 meters, 801 meters to 900 meters, 901 meters to 1000 meters. The second predetermined distance may be the same with or different from the first predetermined distance. Then, in step 770, processor 400 may determine the at least one first location as the match result, and processor 400 may send the first location to driver terminal 140, which may be helpful for a driver associated with the driver terminal 140 to find a passenger easily. In some embodiments, the match result may be send to a user equipment 130. A service requester associated with the user equipment 130 may select the first location as a final location. The final location may then be sent to the driver terminal 140 to help the driver find the service requester.

It should be noted that the above description about the processor of determining the match result is merely exemplary, and is not intended to be limiting. In some embodiments, the order of some steps of the process may be changed, for example, step 710 and step 730. Processor 400 may first determine the geographical distance and then determine the edit distance to generate the second set of candidate locations.

In some embodiments, user equipment 130 may also display a point-selection icon on a user interface associated with the user equipment 130. When there is no location to be selected or the locations shown on the user interface may not meet the service requester's requirement, server 110 may determine the final location by using a map of a geographical area when detecting that the point-selection icon is triggered by the service requester. The map of the geographical area may encompass the initial location.

Figure 8A:
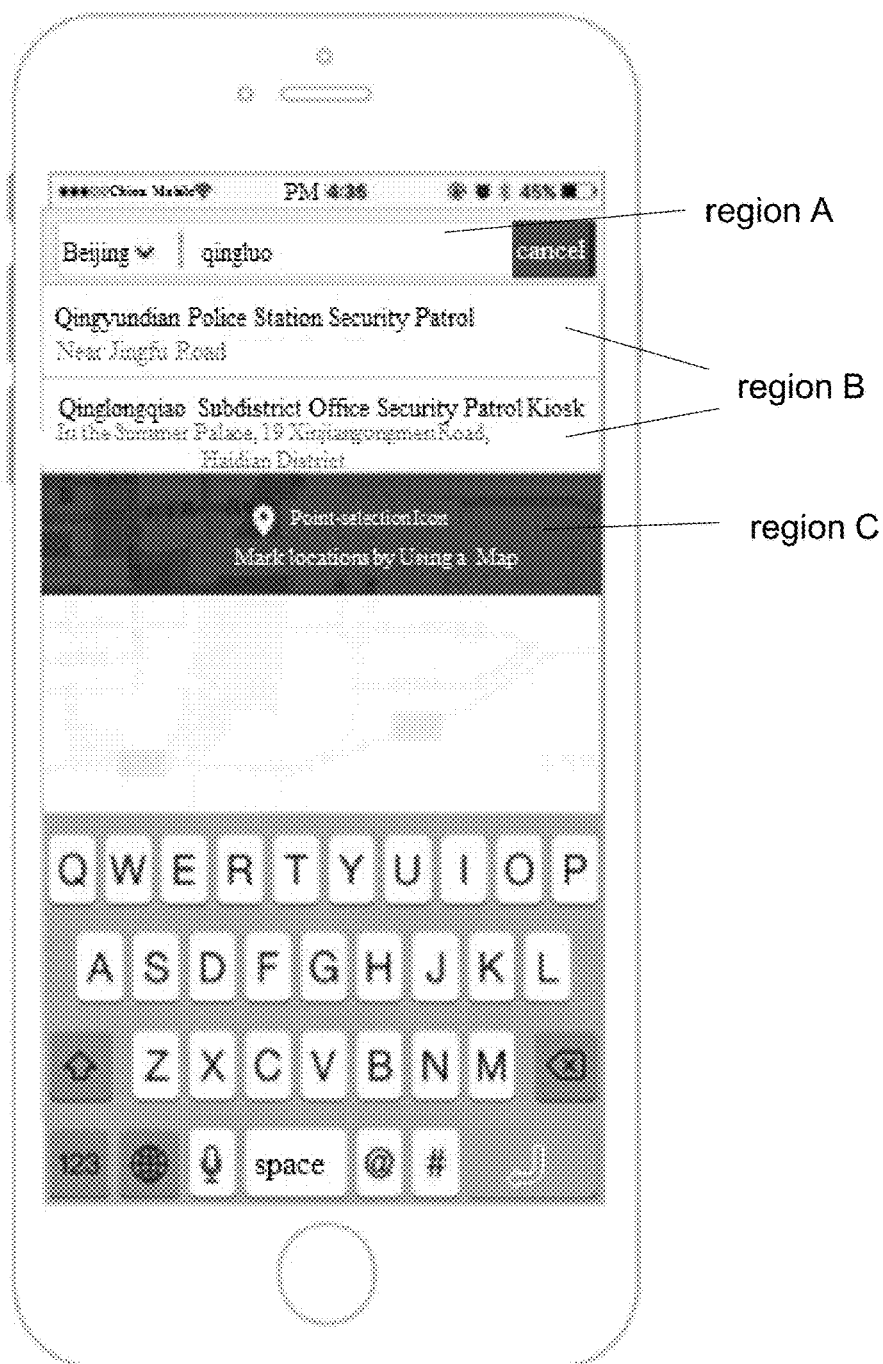
FIG. 8A is a user interface of a user equipment showing the match result and a point-selection icon according to some embodiments of the present disclosure.

FIG. 8A is a user interface of a user equipment. On the user interface, a service requester may input an initial location in the region A; the match result may be displayed in the region B; and a point-selection icon may be displayed in the region C. If the service requester selects one location in the region B, processor 400 may send the selected location to a driver terminal 140. If the service requester triggers the point-selection icon, processor 400 may determine the final location by using a map. The operation of triggering the point-selection icon may include clicking or pressing any position of the region C, e.g., clicking or pressing the point-selection icon. When the point-selection icon is triggered, server 110 may instruct the user equipment to display the map of a geographical area on the user interface.

Figure 8B:
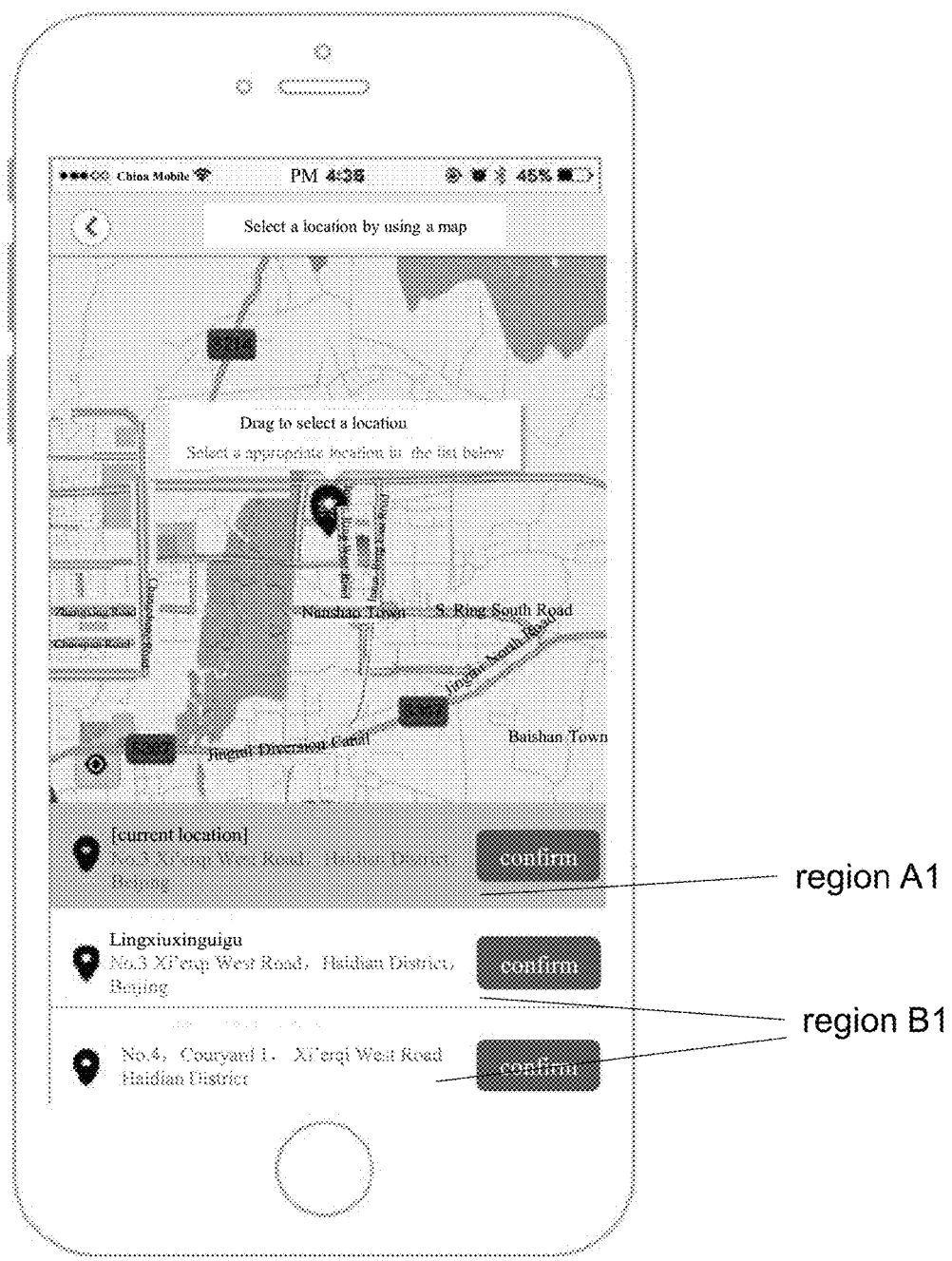
FIG. 8B is a user interface of a user equipment showing a map and some locations according to some embodiments of the present disclosure.

FIG. 8B is a user interface of the user equipment showing a map. The service requester may drag the point-selection icon or the map to make the point-selection icon in a position on the map. Through dragging the point-selection icon, processor 400 may determine the final location based on the position of the point-selection icon. When the point-selection icon is dragged to a first position on the map, the user equipment 130 may display a basic location corresponding to the first position on the user interface, as shown in region A1. In some embodiments, the user equipment 130 may further display one or more second locations on the user interface, as shown in region B1. The second location may be within a third predetermined distance from the basic location. The service requester may click or press the "confirm" button in region A1, and then processor 400 may determine the basic location the final location. When the service requester clicks or presses the "confirm" button in region B1, processor 400 may determine one of the second locations as the final location.

Figure 9:
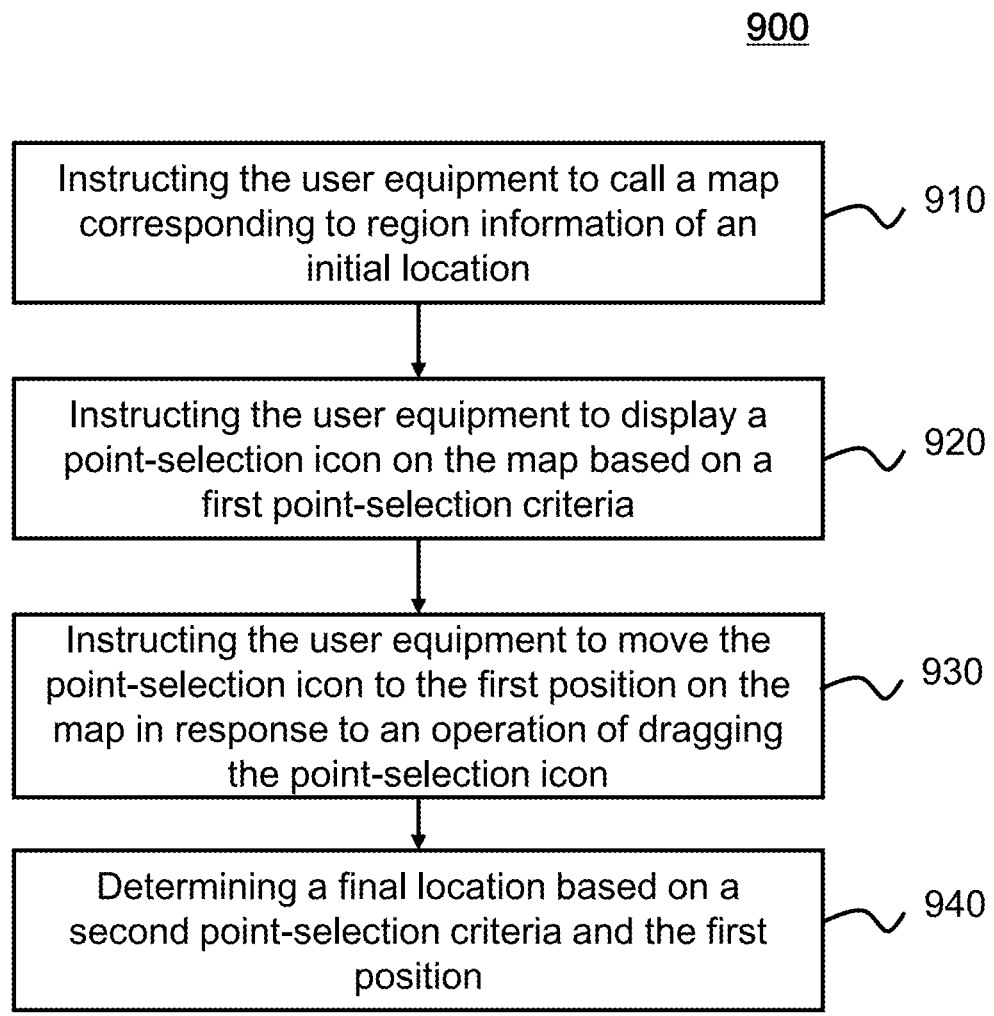
FIG. 9 is a flowchart of an exemplary process for determining a final location by using a map according to some embodiments of the present disclosure.

FIG. 9 is a flowchart of an exemplary process 900 for determining a final location by using a map according to some embodiments of the present disclosure. In some embodiments, the process and/or method 900 may be implemented in the system 100 as illustrated in FIG. 1. For example, the process and/or method 900 may be implemented as one or more sets of instructions and stored in database 150 and/or storage in processing engine 112, and called and/or executed by processor 400.

When detecting that the point-selection icon is triggered, processor 400 may call the map of a geographical area in step 910. In some embodiments, the initial location input by the service requester may include two parts. The first part may include region information, including, e.g., a country, a province, a city, a district, etc. The second part may include address information, including, e.g., a street, a number, a name of a building, a room number, etc. The map displayed on the user interface may correspond to the region information of the initial location. As shown in FIG. 8A, in the region A, "Beijing" is the region information, and "qingluo" is the address information.

The user equipment and/or terminal may show the match result (e.g., one or more matched locations) and the point-selection icon in the region B and region C. When the match result is not selected and the point-selection icon is triggered, processor 400 may instruct the user equipment to display the map of Beijing, as shown in FIG. 8B.

In step 920, processor 400 may instruct the user equipment to display the point-selection icon on the map based on a first point-selection criteria. The first point-selection criteria may be used to control a position of the point-selection icon on the map. Detailed description about the first point-selection criteria may be described with reference to FIG. 10 and FIG. 11.

In step 930, processor 400 may instruct the user equipment to move the point-selection icon to a first position on the map in response to the operation of dragging the point-selection icon or the map by the service requester. The first position on the map may be associated with a basic location. The basic location may be close to a location that the service requester wishes as a starting location or a destination location. In some embodiments, the basic location may be determined as the final location and then be sent to a driver terminal 140.

In some embodiments, processor 400 may further determine the final location based on a second point-selection criteria and the first position/ the basic location in step 940. The second point-selection criteria may be that processor 400 may determine one or more second locations within a third predetermined distance from the basic location and determine one of the second locations or the basic location as the final location. The third predetermined distance may include a predetermined value, including, from 0 to 1 kilometers, 1.1 kilometers to 2 kilometers, or larger than 2 kilometers. In some embodiments, the third predetermined distance may include any suitable value, including, from 0 to 100 meters, 101 meters to 200 meters, 201 meters to 300 meters, 301 meters to 400 meters, 401 meters to 500 meters, 501 meters to 600 meters, 601 meters to 700 meters, 701 meters to 800 meters, 801 meters to 900 meters, 901 meters to 1000 meters. The third predetermined distance may be the same with or different from the first/second predetermined distance. The second locations may be the whole or part of locations within the third predetermined distance from the basic location. The number of the second locations may be one, two, three, four, five, or other number. In some embodiments, the second locations may be the three nearest locations from the basic location.

Referring back to FIG. 8B, when the point-selection icon is dragged to the first position on the map, the user equipment may display the basic location corresponding to the first position on the user interface, as shown in region A1, and the one or more second locations may also be displayed on the user interface, as shown in region B1. The service requester may click or press the "confirm" button in region A1, and then processor 400 may determine the basic location as the final location. When the service requester clicks or presses the "confirm" button in region B1, processor 400 may determine one of the second locations as the final location.

For a transport service, a service requester may input a starting location and a destination location to request the transport service. The initial location input by the service requester may include the starting location and the destination location. The starting location may be input in the starting address box and the destination location may be input in the destination address box. The starting location may include region information and address information. The destination location may also include region information and address information. The region information of the starting location and the region information of the destination location may be the same with or different from each other. In some embodiments, when the starting location and the destination location are received, processor 400 may then perform the operation of comparing the starting location and/or the destination location with candidate locations in database 150. In some embodiments, when the destination location has been received and the starting location has not been received, processor 400 may compare the destination location (e.g., address information of the destination location, represented as "location B1") with candidate locations in database 150. In some embodiments, when the starting location has been received and the destination location has not been received, processor 400 may compare the starting location (e.g., address information of the starting location, represented as "location A1") with candidate locations in database 150.

Figure 10:
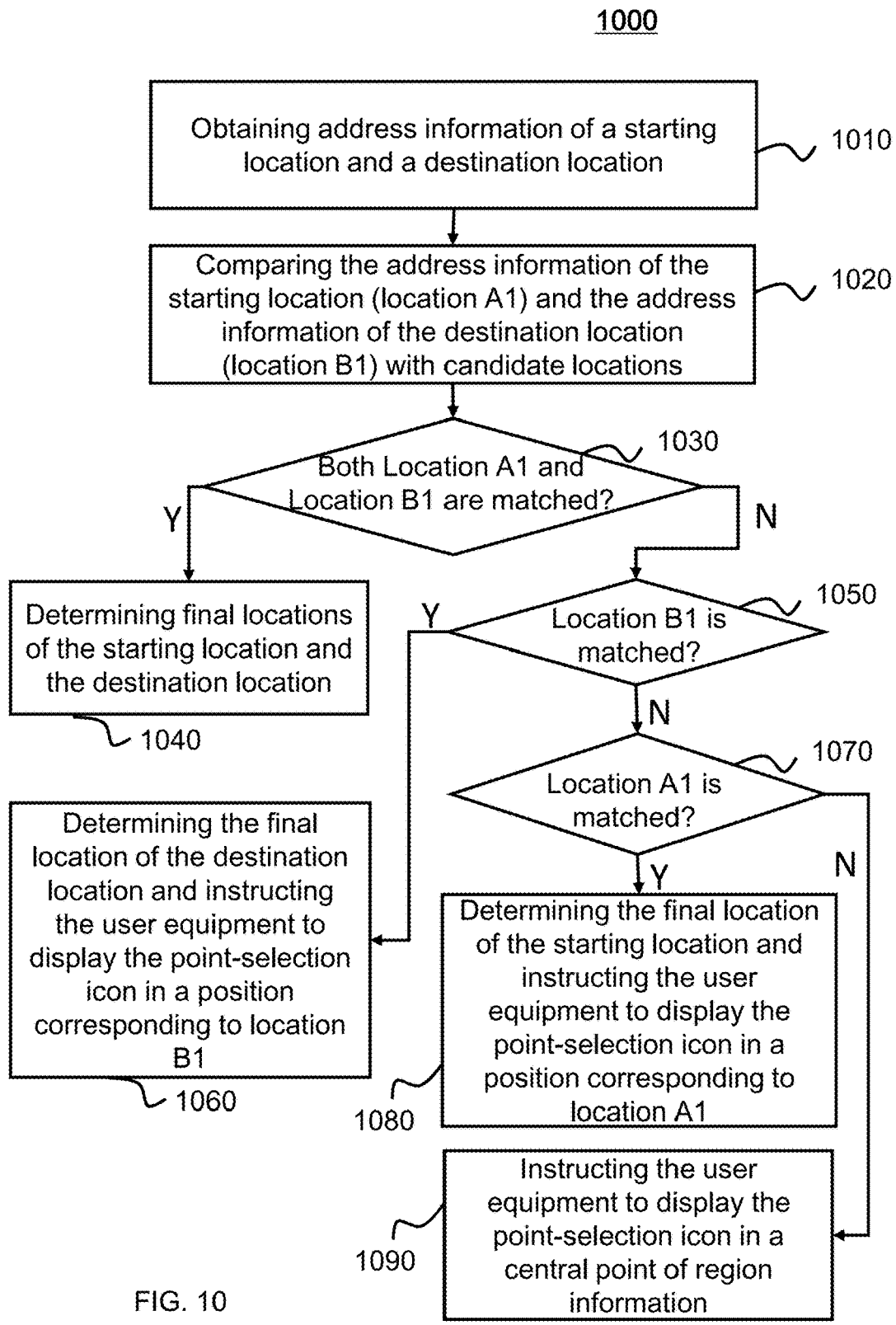
FIG. 10 is a flowchart of an exemplary process for determining the position of the point-selection icon according to some embodiments of the present disclosure.

FIG. 10 shows a flowchart of an exemplary process 1000 for determining the position of the point-selection icon when the region information of the starting location and the region information of the destination location are the same with each other and the comparison is performed after the starting location and the destination location have been received according to some embodiments of the present disclosure. In some embodiments, the process and/or method 1000 may be implemented in the system 100 as illustrated in FIG. 1. For example, the process and/or method 1000 may be implemented as one or more sets of instructions and stored in database 150 and/or storage in processing engine 112, and called and/or executed by processor 400.

In step 1010, processor 400 may obtain the address information of the starting location and the address information of the destination location. It should be noted that the obtaining of the address information of the starting location and the address information of the destination location may be performed in different steps.

In step 1020, processor 400 may compare the address information of the starting location (location A1) with candidate locations in database 150 to generate a match result corresponding to the starting location. In step 1020, processor 400 may also compare the address information of the destination location (location B1) with candidate locations in database 150 to generate a match result corresponding to the destination location.

In step 1030, processor 400 may determine whether both the location B1 and the location A1 are matched. The situation that the location B1 is matched may include that the match result corresponding to the destination location includes one or more matched locations and one of the matched location is selected as the final location of the destination location by the service requester. The situation that the location A1 is matched may include that the match result corresponding to the starting location includes one or more matched locations and one of the matched location is selected as the final location of the starting location by the service requester. The situation that the location B1 is not matched may include that the match result corresponding to the destination location includes no matched location or that no matched location is selected as the final location of the destination location by the service requester. The situation that the location A1 is not matched may include that the match result corresponding to the starting location includes no matched location or that no matched location is selected as the final location of the starting location by the service requester.

When processor 400 determines that both the location B1 and the location A1 are matched, the process and/or method 1000 may go to step 1040. In step 1040, processor 400 may determine the corresponding selected matched locations as the final locations of the starting location and the destination location.

When processor 400 determines that both the location B1 and the location A1 are not matched, the process and/or method 1000 may go to step 1050. In step 1050, processor 400 may determine whether the location B1 is matched. If the location B1 is matched, the process and/or method 1000 may go to step 1060. In step 1060, processor 400 may determine the corresponding selected matched location as the final location of the destination location and instruct the user equipment 130 to display the point-selection icon in a position of a map, wherein the position may correspond to the location B1 to determine the final location of the starting location. If the location B1 is not matched, the process and/or method 1000 may go to step 1070. In step 1070, processor 400 may determine whether the location A1 is matched. If the location A1 is matched, the process and/or method 1000 may go to step 1080. In step 1080, processor 400 may determine the corresponding selected matched location as the final location of the starting location and instruct the user equipment 130 to display the point-selection icon in a position of a map, wherein the position may correspond to the location A1 to determine the final location of the destination location.

If the location A1 is not matched, processor 400 may instruct the user equipment 130 to display the point-selection icon in a central point of a map displaying of the region information of the starting/destination location in step 1090. In some embodiments, the region information of the starting location and/or destination location may include one or more sub-regions. The areas of the sub-regions may be different. The point-selection icon may be displayed in any position of any of the one or more sub-regions. For example, the point-selection icon may be displayed in the central point of the sub-region with the largest area.

In some embodiments, the orders or sequence for some steps, for example, step 1050 and step 1070, may be switched.

Figure 11:
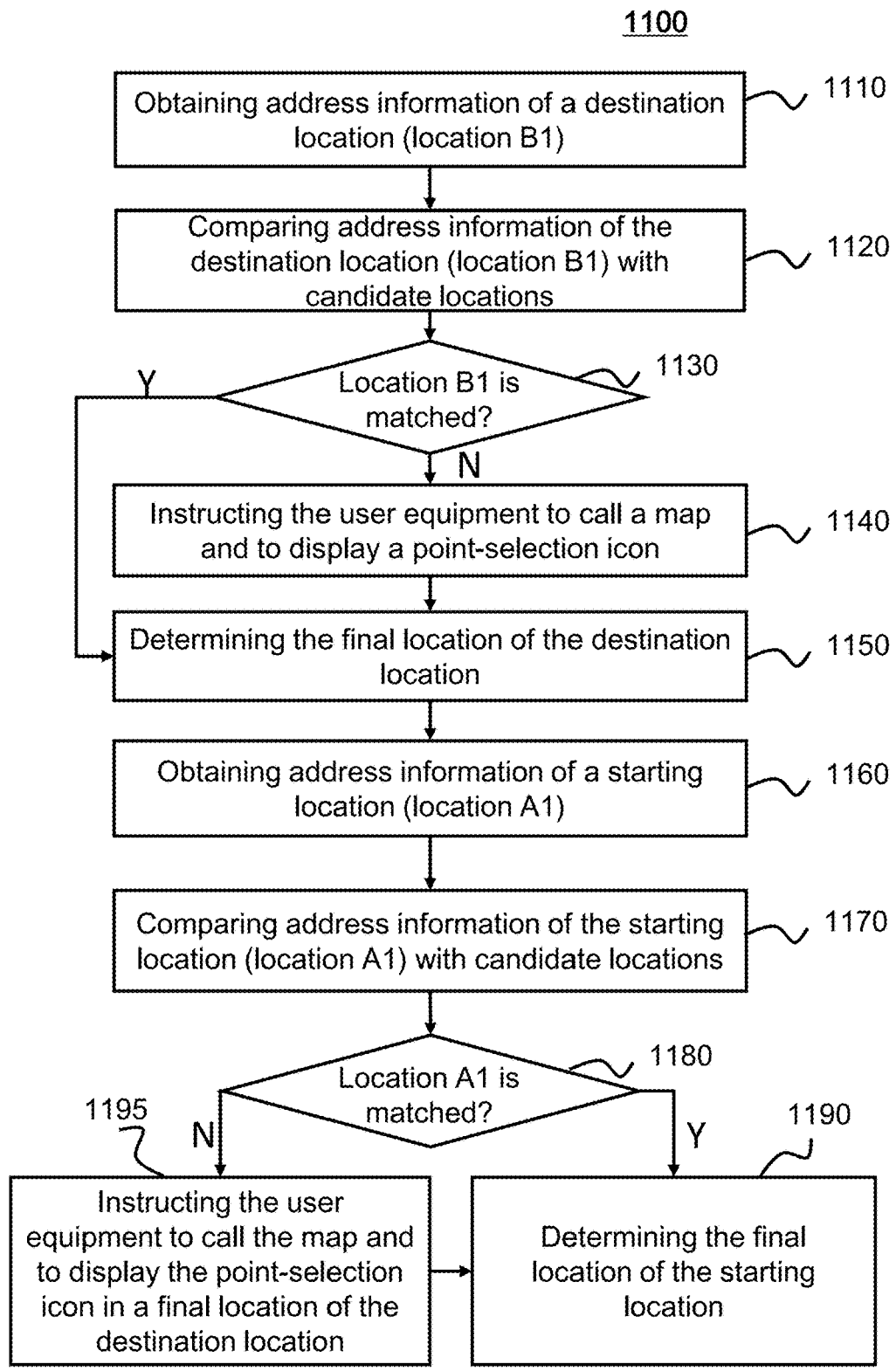
FIG. 11 is a flowchart of another exemplary process for determining the position of the point-selection icon according to some embodiments of the present disclosure.

FIG. 11 shows a flowchart of an exemplary process 1100 for determining the position of the point-selection icon when the region information of the starting location and the region information of the destination location are the same with each other and the comparison is performed after the destination location have been received and the starting location has not been received according to some embodiments of the present disclosure. In some embodiments, the process and/or method 1100 may be implemented in the system 100 as illustrated in FIG. 1. For example, the process and/or method 1100 may be implemented as one or more sets of instructions and stored in database 150 and/or storage in processing engine 112, and called and/or executed by processor 400.

In step 1110, processor 400 may obtain the address information of the destination location (location B1). In step 1120, processor 400 may compare the location B1 with a plurality of candidate locations in database 150 to generate a match result corresponding to the destination location.

In step 1130, processor 400 may determine whether the location B1 is matched (e.g., the match result corresponding to the destination location includes one or more matched locations and one of the matched locations is selected by the service requester).

If the location B1 is not matched, the processor 400 may instruct the user equipment to display a point-selection icon on the user interface. When the point-selection icon is triggered, the use equipment may send a corresponding signal to the system 100. Accordingly, processor 400 may receive the signal and respond to instruct the user equipment to call a map and to display the point-selection icon on the user interface in step 1140, wherein the map may encompass the region information of the destination location. The point-selection icon may be in any position of the map. In some embodiments, the point-selection icon may be in the central point of a map displaying the region information of the destination location. Then, through moving the point-selection icon, processor 400 may determine the final location of the destination location based on the second point-selection criteria.

If the location B1 is matched, the process and/or method 1100 may go to step 1150. In step 1150, processor 400 may determine the selected matched location as the final location of the destination location. Then in step 1160, processor 400 may obtain the address information of the starting location (location A1). In step 1170, processor 400 may compare the location A1 with candidate locations in database 150 to generate a match result corresponding to the starting location. In step 1180, processor 400 may determine whether the location A1 is matched.

If the location A1 is matched, processor 400 may determine the corresponding selected matched location as the final location of the starting location in step 1190.

If the location A1 is not matched, processor 400 may instruct the user equipment to display a point-selection icon on the user interface. When the interface is triggered, the use equipment may send a corresponding signal to the system 100. Accordingly, processor 400 may receive the signal and respond to call a map and instruct the user equipment to display the point-selection icon on the user interface in step 1195. The point-selection icon may be in any position of the map. In some embodiments, the position may correspond to the final location of the destination location determined in step 1150. In some embodiments, the position may locate at the central point of the displayed map. Then, through moving the point-selection icon, processor 400 may determine the final location of the starting location based on the second point-selection criteria.

In some embodiments, the service requester may input the starting location first. When processor 400 receives the starting location, processor 400 may determine the final location of the starting location. After the final location of the starting location has been determined, the service requester may then input the destination location. The process and/or method may be similar to the process and/or method 1100. When the starting location has been received, processor 400 may compare the starting location (e.g., address information of the starting location, also referred to herein as "location A1") with candidate locations in database 150. If the address information of the starting location is not matched, a point-selection icon may be displayed on the user interface. When the point-selection icon is triggered, processor 400 may instruct the user equipment to call a map to display the point-selection icon and/or map on the user interface, wherein the map may encompass the region information of the starting location. The point-selection icon may be in any position of the map. In some embodiments, the point-selection icon may be in the central point of the map. Then, through moving the point-selection icon, processor 400 may determine the final location of the starting location based on the second point-selection criteria. If the match result includes one or more matched locations and one of the matched locations is selected by the service requester as the final location of the starting location. When the final location of the starting location is determined, the service requester may be allowed to input the destination location in the destination address box. If the destination location (e.g., the address information of the destination location, represented as "location B1") is not matched with any candidate location in database 150 (e.g., the match result includes no matched location or no matched location is selected as the final location of the destination location by the service requester), when the point-selection icon is triggered, processor 400 may instruct the user equipment to call a map to display the point-selection in any position on the map. In some embodiments, the position may correspond to the address information of the starting location (e.g., the position may correspond to location A1). In some embodiments, the position may be the central point of the map.

In some embodiments, the region information of the starting location and the region information of the destination location may be different from each other. For example, the region information of the starting location is city A and the region information of the starting location is city B, when the address information of the stating location (location A1) is not matched with the candidate locations in database 150, and when the point-selection icon is triggered on the user interface, the map of the city A may be displayed and the point-selection icon may be displayed in the central point of the map of city A. When the address information of the destination location (location B1) is not matched with the candidate locations in database 150, and when the point-selection icon is triggered on the user interface, the map of the city B may be displayed and the point-selection icon may be displayed in the central point of the map of city B.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

The invention claimed is:

1. A system for improving accuracy of determining a location of a service requester of an online transportation service, comprising:
   a bus;
   at least one storage medium electronically connected to the bus, including a set of instructions for determining a final location associated with the service requester; and
   logic circuits in communication with the storage medium via the bus, wherein when executing the set of instructions, the logic circuits are directed to:
   obtain signals including an initial location sent from a network associated with the service requester, wherein the initial location is included in an online on-demand transportation request;
   compare the initial location with a second set of candidate location of a plurality of candidate locations in a database to generate at least one match result, wherein each of the plurality of candidate locations describes a location of the service requester more accurately than the initial location, determining the second set of candidate locations comprising:
   determine an edit distance between the initial location and each of the plurality of candidate locations;
   select, from the plurality of candidate locations, a first set of candidate locations corresponding to a first number of smallest edit distances;
   determine a geographical distance between the initial location and each of the first set of the candidate locations;
   select, from the first set of candidate locations, the second set of candidate locations, wherein corresponding geographical distance between the initial location and each of the second set of the candidate locations is smaller than a first predetermined distance; and
   determine the final location based on the at least one match result, wherein the final location is associated with the initial location and is easier to find than the initial location for a third-party person meeting with the service requester.

2. The system of claim 1, wherein the initial location is obtained by scanning a bar code by a user equipment associated with the service requester.

3. The system of claim 1, wherein the initial location is obtained by triggering a fix terminal in a fix location by the service requester.

4. The system of claim 1, wherein to compare the initial location with the plurality of candidate locations in the database, the logic circuits are further directed to:
determine a central location of the second set of candidate locations based on attitudes and longitudes of the second set of candidate locations; and
determine the central location as the at least one match result.

5. The system of claim 4, wherein to compare the initial location with the plurality of candidate locations in the database, the logic circuits are further directed to:
determine at least one first location that is within a second predetermined distance from the central location; and
determine the at least one first location as the at least one match result.

6. The system of claim 1, wherein to determine the final location based on the at least one match result, the logic circuits are further directed to:
determine that one of the at least one match result is selected by the service requester; and
determine the selected match result as the final location.

7. The system of claim 1, wherein to determine the final location based on the at least one match result, the logic circuits are further directed to:
determine that the at least one match result is not selected by the service requester; and
determine the final location by using a map of a geographical area encompassing the initial location when the at least one processor detects that a point-selection icon is triggered.

8. The system of claim 7, wherein to determine the final location by using the map, the logic circuits are further directed to:
instruct a user equipment to call the map of the geographical area corresponding to region information of the initial location;
instruct the user equipment to display the point-selection icon on the map based on a first point-selection criteria;
instruct the user equipment to move the point-selection icon to a first position on the map in response to an operation of dragging the point-selection icon, wherein the first position is associated with a basic location; and
determine the final location based on a second point-selection criteria and the basic location.

9. The system of claim 8, wherein to determine the final location based on the second point-selection criteria and the basic location, the logic circuits are further directed to:
determine one or more second locations within a third predetermined distance from the basic location; and
determine one of the second locations or the basic location as the final location.

10. A method for improving accuracy of determining a location of a service requester of an online transportation service, comprising:
obtaining, by at least one computer server of an online transportation service platform, signals encoding an initial location associated with the service requester, wherein the initial location is included in an online on-demand transportation request;
comparing, by the at least one computer server, the initial location with a second set of candidate locations of a plurality of candidate locations in a database to generate at least one match result, wherein each of the plurality of candidate locations describes a location of the service requester more accurately than the initial location, determining the second set of candidate locations comprising:
determine an edit distance between the initial location and each of the plurality of candidate locations;
select, from the plurality of candidate locations, a first set of candidate locations corresponding to a first number of smallest edit distances;
determine a geographical distance between the initial location and each of the first set of the candidate locations;
select, from the first set of candidate locations, the second set of candidate locations, wherein corresponding geographical distance between the initial location and each of the second set of the candidate locations is smaller than a first predetermined distance; and
determining, by the at least one computer server, a final location based on the at least one match result, wherein the final location is associated with the initial location is easier to find than the initial location for a third-party person meeting with the service requester.

11. The method of claim 10, wherein the initial location is obtained by scanning a bar code by a user equipment associated with the service requester.

12. The method of claim 10, wherein the initial location is obtained by trigging a fix terminal in a fix location by the service requester.

13. The method of claim 10, wherein the comparing of the initial location with the plurality of candidate locations in the database, further comprises:
determining, by the at least one computer server, a central location of the second set of candidate locations based on attitudes and longitudes of the second set of candidate locations; and
determining, by the at least one computer server, the central location as the at least one match result.

14. The method of claim 13, wherein the comparing of the initial location with the plurality of candidate locations in the database, further comprises:
determining, by the at least one computer server, at least one first location that is within a second predetermined distance from the central location; and
determining, by the at least one computer server, the at least one first location as the at least one match result.

15. The method of claim 10, wherein the determining of the final location based on the at least one match result further comprises:
determining, by the at least one computer server, that one of he at least one match result is selected by the service requester; and
determining, by the at least one computer server, the selected match result as the final location.

16. The method of claim 10, wherein the determining of the final location based on the at least one match result further comprises:
determining, by the at least one computer server, that the at least one match result is not selected by the service requester; and
determining, by the at least one computer server, the final location by using a map of a geographical area encompassing the initial location when the at least one computer server detects that a point-selection icon is triggered.

17. The method of claim 16, wherein the determining of the final location by using the map further comprises:
- instructing a user equipment to call, by the at least one computer server, the map of the geographical area corresponding to region information of the initial location;
- instructing a user equipment to display, by the at least one computer server, the point-selection icon on the map based on a first point-selection criteria;
- instructing the user equipment to move, by the at least one computer server, the point-selection icon to a first position on the map in response to an operation of dragging the point-selection icon, wherein the first position is associated with a basic location; and
- determining, by the at least one computer server, the final location based on a second point-selection criteria and the basic location.

18. The method of claim 17, wherein the determining of the final location based on the second point-selection criteria and the basic location further comprises:
- determining, by the at least one computer server, one or more second locations within a third predetermined distance from the basic location; and
- determining, by the at least one computer server, one of the second locations or the basic location as the final location.

* * * * *